(12) United States Patent
Choby (10) Patent No.: US 8,706,378 B2
(45) Date of Patent: Apr. 22, 2014

(54) SYSTEMS AND METHODS FOR DETERMINING ROAD MU AND DRIVE FORCE

(75) Inventor: Jordan Choby, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 18 days.

(21) Appl. No.: 13/304,939

(22) Filed: Nov. 28, 2011

(65) Prior Publication Data

US 2013/0138318 A1 May 30, 2013

(51) Int. Cl.
  *B60T 7/12* (2006.01)
  *B60K 28/16* (2006.01)
  *B60K 17/34* (2006.01)
  *B60T 8/24* (2006.01)
  *B60T 8/60* (2006.01)

(52) U.S. Cl.
  USPC ............ 701/84; 701/70; 701/82; 180/197; 180/243; 303/139; 303/146; 303/148

(58) Field of Classification Search
  USPC ............ 701/70, 82, 84; 303/139, 146, 148; 180/197, 243
  See application file for complete search history.

(56) References Cited

U.S. PATENT DOCUMENTS

| | | | | |
|---|---|---|---|---|
| 4,873,639 A * | 10/1989 | Sato et al. | | 701/90 |
| 4,916,619 A | 4/1990 | Walenty et al. | | |
| 5,180,027 A | 1/1993 | Hagiya | | |
| 5,275,474 A * | 1/1994 | Chin et al. | | 303/148 |
| 5,406,486 A * | 4/1995 | Kamio et al. | | 701/84 |
| 5,428,539 A * | 6/1995 | Kawamura et al. | | 701/84 |
| 5,524,080 A * | 6/1996 | May | | 701/88 |
| 5,574,643 A * | 11/1996 | Yesel | | 701/88 |
| 5,584,541 A * | 12/1996 | Sone et al. | | 303/146 |
| 5,636,121 A * | 6/1997 | Tsuyama et al. | | 701/70 |
| 5,752,211 A * | 5/1998 | Takasaki et al. | | 701/69 |
| 5,762,157 A * | 6/1998 | Uehara | | 180/197 |
| 6,076,035 A | 6/2000 | Yanase | | |
| 6,308,127 B1 | 10/2001 | Tsunehara | | |
| 6,334,500 B1 * | 1/2002 | Shin | | 180/197 |
| 6,412,886 B1 * | 7/2002 | Abe et al. | | 303/139 |
| 6,473,682 B1 | 10/2002 | Nakamura | | |
| 6,484,832 B1 | 11/2002 | Morisawa et al. | | |
| 6,533,367 B1 | 3/2003 | Latarnik et al. | | |
| 6,542,806 B1 | 4/2003 | Suhre et al. | | |
| 6,549,840 B1 | 4/2003 | Mikami et al. | | |

(Continued)

OTHER PUBLICATIONS

Mutoh et al.; "Driving Force Control Method for Front-and-Rear-Wheel-Independent-Drive-Type Electric Vehicles (FRID EVs) Effective for Safe Driving Under Various Road Conditions"; IEEE Vehicle Power and Propulsion Conference (VPPC), Sep. 3-5, 2008, 6 pages.

*Primary Examiner* — Thomas Black
*Assistant Examiner* — Tyler Paige
(74) *Attorney, Agent, or Firm* — Snell & Wilmer LLP (57) ABSTRACT

The vehicle described herein employs a mu logic module. The mu logic module monitors vehicle operating conditions, and based on those operating conditions determines a road surface mu in response to a wheel slip event. The road surface mu is then used to determine a drive force to minimize or control the wheel slip event. The mu logic module continually monitors and adjusts the drive force provided to at least one of the wheels to maximize the applied drive force, while stabilizing and controlling wheel slip events to ensure safe operation of a vehicle.

20 Claims, 4 Drawing Sheets

(56) References Cited

U.S. PATENT DOCUMENTS

| | | |
|---|---|---|
| 6,604,040 B2 | 8/2003 | Kawasaki et al. |
| 6,681,167 B2 | 1/2004 | Bedner et al. |
| 6,691,017 B2 | 2/2004 | Banno et al. |
| 6,882,921 B2 * | 4/2005 | Priemer et al. .................. 701/86 |
| 7,237,639 B2 | 7/2007 | Kowatari et al. |
| 7,512,473 B2 | 3/2009 | Nakao |
| 7,650,216 B2 | 1/2010 | Itoh et al. |
| 7,792,625 B2 * | 9/2010 | Hrovat et al. ................... 701/82 |
| 8,170,768 B2 * | 5/2012 | Fujimoto et al. ............... 701/90 |
| 8,229,639 B2 * | 7/2012 | Craig et al. ..................... 701/70 |
| 2004/0133324 A1 * | 7/2004 | Yasui et al. ..................... 701/41 |
| 2005/0038588 A1 | 2/2005 | Shukla |
| 2008/0283325 A1 * | 11/2008 | Kodama et al. ............... 180/243 |
| 2009/0240415 A1 * | 9/2009 | Sukaria .......................... 701/84 |
| 2009/0326777 A1 * | 12/2009 | Oshima et al. ................. 701/83 |
| 2010/0025131 A1 | 2/2010 | Gloceri et al. |
| 2010/0114449 A1 | 5/2010 | Shiozawa et al. |
| 2010/0191434 A1 | 7/2010 | Fujita et al. |
| 2010/0211278 A1 * | 8/2010 | Craig et al. ..................... 701/70 |
| 2013/0138318 A1 * | 5/2013 | Choby ............................. 701/84 |

* cited by examiner

SYSTEMS AND METHODS FOR DETERMINING ROAD MU AND DRIVE FORCE

BACKGROUND

1. Field

The present invention relates to systems and methods for estimating road mu and adjusting tractive and/or drive force applied to one or more wheels of a vehicle to prevent wheel slip.

2. Description of the Related Art

Traditional traction control management system typically employ power reduction schemes that arbitrarily reduce power and associated drive force to the wheels when they are activated by a user or when a wheel spin condition is detected. For example, many automobiles today include a snow mode. Snow mode is accomplished by manually tuning transmission shifts to dampen or detune the aggressiveness of an engine/transmission. By simply cutting the power applied to the wheels, snow mode is able to enable an automobile to achieve better traction on slippery surfaces such as snow and ice.

Modern automobiles may also employ slightly more advanced systems. For example, some automobiles include traction control systems. These systems are configured to detect a wheel spin or wheel slip event and cut a set amount of power to the spinning/slipping wheel. While, automobiles with a snow mode or a traction control system provide safer driving situations, these modes or systems artificially manage the power applied to the wheels. Put another way, these modes or systems do not determine what drive force should be applied; rather, they automatically reduce the drive force applied when selected or when a wheel spin event is detected.

Thus, there is a need for systems and methods that that are capable of detecting wheel spin and/or a slip event, determining appropriate drive force, and adjusting the automobiles operating to achieve the appropriate drive force during operation.

SUMMARY

In various exemplary embodiments, an automobile comprises a body, an engine, a plurality of wheels, a steering wheel, an accelerator, a sensor, and an electronic control unit. The engine is at least partially enclosed by the body. One or more wheels are engaged and driven by the engine. The steering wheel and/or accelerator are configured to communicate driver inputs to the plurality of wheels and the engine. The sensor is configured to monitor the operation of at least one of the wheels to detect a first slip/spin condition of the wheel. The electronic control unit is configured to receive data from the sensor and manage the operation of the engine. In response to a first slip condition, the electronic control unit is configured to calculate a first drive force. The first drive force is determined based on a tractive force model. Based on this tractive force model, the electronic control unit increases the first drive force to a second drive force.

In exemplary embodiments, the sensor continues to monitor the wheel in response to the first slip/spin condition to detect a second slip condition. In response to the second slip/spin condition, the electronic control unit reduces the second drive force to a third drive force. The third drive force is also determined based on the tractive force model. The first slip/spin condition and/or second slip/spin condition may be detected when the automobile is in a drive gear or a reverse gear.

In these exemplary embodiments, the electronic control unit is configured to approximate a mu value of the road in response to vehicle operating conditions. The first tractive force and/or second tractive force is determined as a function of the approximate mu value of the road. Moreover, the mass of the automobile is used to determine the first tractive force and/or second tractive force. To conduct this analysis, the electronic control unit employs the tractive force model in response to a first slip/spin condition and/or a second slip/spin condition. Moreover, the tractive force model may include thresholds or rules, such that when the vehicle is operating within a predetermined speed range, the logic is employed to reduce the spin, but when the vehicle is operating outside of a predetermined speed range, the logic is not employed and the spin is not mitigated.

In exemplary embodiments, an automobile with a sensor, a plurality of wheels, and an electronic control unit is provided. The electronic control unit or other suitable control device may comprise a mu control comprising a speed threshold and a tractive force model. The electronic control unit or suitable control device may be configured to detect and mitigate wheel spin using control methods. More specifically, the sensor is configured to detect a first slip condition at one of the plurality of wheels. In response to the first slip condition, the electronic control unit or suitable control device compares the operating speed of the automobile to the speed threshold. Where the rules governing slip/spin mitigation are satisfied, the electronic control unit or suitable control device calculates a first drive force in response to the first slip condition. To achieve the first drive force, power is reduced to at least one of the plurality of wheels. The sensors continue to monitor the plurality of wheels. The electronic control unit or suitable control device increases the first drive force provided to at least one of the plurality of wheels. In response to detecting a second slip condition at one of the plurality of wheels by the sensor, the electronic control unit or suitable control device calculates a second drive force based on the increase in the first drive force and the tractive force model. Based on the second drive force the power provided to at least one of the plurality of wheels is adjusted to achieve the second drive force at the at least one of the plurality of wheels.

In exemplary embodiments, the first slip condition is detected by comparing an actual acceleration rate of the wheel to an expected acceleration rate of the wheel. This expected acceleration rate is a function of the mass of the automobile, a road grade and/or a drive force being created. The electronic control unit or suitable control device is capable of estimating a road surface mu. The road surface mu is estimated by detecting an initial drive force at substantially the same time as the first slip condition.

In these embodiments, the tractive force may be a function of the mass of the automobile. The tractive force may also be a function of the mass and a road surface mu. The mass is determined as a function of road grade or by any other suitable method.

In exemplary embodiments, an automobile comprises an electronic control unit, an engine, and a plurality of wheels. The electronic control unit comprises a mu drive force model. The engine is in electronic communication with the electronic control unit and configured to provide a first drive force based on an input from the electronic control unit. The plurality of wheels are configured to be driven by the engine. The electronic control unit is configured to detect a slip condition of at least one of the plurality of wheels and estimate an applied drive force at the at least one of the plurality of wheels in response to the slip condition such that the applied drive force is estimated at substantially the same time that the slip condition occurs. The electronic control unit is also configured to estimate a road mu based on the applied drive force and calculate and communicate a second drive force to the engine such that power to the wheel is reduced to a level that produces the second drive force.

In various exemplary embodiments, the drive force model is configured to determine the second drive force based on the estimated road mu and a mass of the automobile. Moreover, in exemplary embodiments, the mu drive-force model is engaged in response to a snow mode setting being selected.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

In various exemplary embodiments, a vehicle may comprise and/or be equipped with a mu logic module. The mu logic module is configured to determine the mu value of the road in response to a triggering event and appropriately adjust the amount of power and/or torque provided to the wheels of the vehicle.

In various embodiments, the mu logic module may be any suitable hardware, software, and/or hardware-software system configured to determine road mu. The mu logic module may comprise and/or operate on an existing electronic control unit ("ECU") or a dedicated ECU. The mu logic module may be configured to receive vehicle performance data from any vehicle component or sensor including, for example, a wheel, a differential, a wheel slip sensor, and/or the like. The mu logic module may be installed at any suitable location in any vehicle. Moreover, the mu logic module may comprise or be configured to interface with various existing automobile components and/or systems, including for example, a vehicle steering system, a vehicle drive train, and/or the like.

Figure 1:
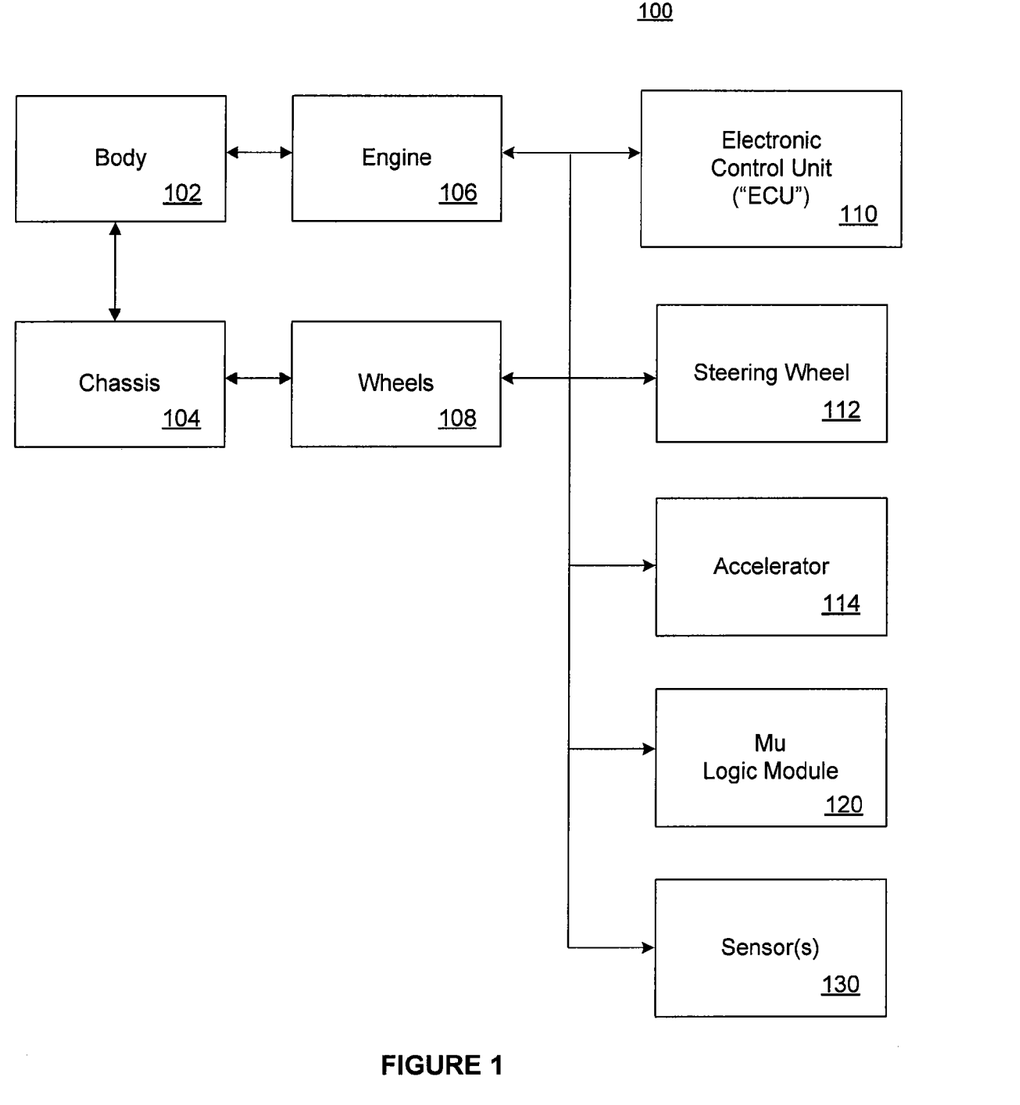
FIG. 1 is a box diagram of an automobile comprising an engine and a control unit comprising a mu logic module in accordance with exemplary embodiments.

In an exemplary embodiment and with reference to FIG. 1, a vehicle 100 generally comprises a body 102, a chassis 104, an engine 106, a plurality of wheels 108, and/or an ECU 110. The vehicle 100 also comprises and/or is configured with a steering wheel 112, an accelerator 114, a mu logic module 120 and one or more sensors 130. In these embodiments, the body 102 mounts and couples to the chassis 104. The chassis 104 rotatably couples to the wheels 108. The engine 106 mounts to and is supported by the chassis 104 and is at least partially enclosed by the body 102. The steering wheel 112 communicates inputs from a driver to the wheels 108. The accelerator 114 provides inputs to the wheels 104 and the engine 106 and/or the ECU 110. The ECU 110 is in electronic communication (e.g., wired or wireless communication) with the engine 106 and is installed at any suitable location within the vehicle 100. The ECU 110 also comprises and/or is in electronic communication (e.g., wired or wireless) with the mu logic module 120. One or more sensors 130 may be installed at any suitable position(s) on the vehicle 100 and may electronically communicate with the ECU 110 and/or the mu logic module 120.

The engine 106 primarily drives the wheels 108. The engine 106 may be any suitable motor configured to consume fuel and/or energy and output power such as, for example, an internal combustion engine, an electric motor, a hybrid internal combustion engine-electric motor, or any other suitable power generation system, which is suitable to move the vehicle 100.

The mu logic module 120 may be any hardware, or hardware-software system configured to determine a tractive force based on or in response to a wheel slip event. The mu logic module 120 may comprise or be configured with a tractive force model. Based on the tractive force model and operating parameters of the vehicle 100, the mu logic module 120 determines the maximum drive force that can be applied to one or more wheels 108. This maximum drive force is the highest amount of torque or power that can be applied to one or more wheels 108 without creating an undesirable amount of wheel slip. The mu logic module 120 may then send the determined maximum drive force to the ECU 110 or may command the engine 106 to apply the determined maximum drive force to the wheels 108.

By determining and applying the maximum drive force to the wheels 108, the mu logic module 120 enables the vehicle 100 to maintain control and traction after the initial wheel slip event. Moreover, the mu logic module 120 drives one or more wheels 108 with a dynamically determined drive force, instead of reducing power to a predetermined threshold. In this way, the mu logic module 120 preserves the performance capability of the vehicle 100, while minimizing wheel slip events. In other words, the mu logic module 120 is configured to minimize or control wheel slip events by eliminating or reducing the wheel slip experienced by a driver operating vehicle 100.

In various embodiments, the mu logic module 120 improves the vehicle's ability to launch and accelerate in launch operating conditions and/or on low mu surfaces. In exemplary embodiments, the mu logic module 120 may be configured to minimize wheel slip or burn out in high performance applications. In other exemplary embodiments, the mu logic module 120 may be configured to minimize wheel slip in low mu driving conditions including, for example, wet road conditions, snow covered road conditions, icy road conditions, dirt and/or gravel road conditions, and/or the like. In operation, the mu logic module 120 initially determines the threshold tractive force or drive force. The mu logic module 120 determines this force by comparing vehicle inputs to the tractive force model. During acceleration, if a wheel slip event occurs, the mu logic module 120 uses the detected vehicle input information to dynamically determine a road mu and a tractive force threshold. The tractive force threshold can then be applied to limit the drive force applied to the wheels based on the tractive force threshold, road mu, or other parameters.

In operation, when the tractive force threshold is applied, the driver depresses the accelerator 114, but the acceleration of the vehicle 100 will not exceed the applied tractive force threshold. In other words, the dynamically determined tractive force threshold prevents the driver from over accelerating and causing a wheel slip event based on the road mu or other parameters. This control logic allows the driver to maintain safe and comfortable (e.g., smooth acceleration) operation of the vehicle 100 in various driving conditions including, for example, high performance driving conditions and/or low mu road surface driving conditions. The mu logic module 120 continues to monitor the vehicle input information after the initial tractive force threshold is established, and continually adjusts the tractive force threshold based on changing road mu conditions and vehicle operating conditions.

In various embodiments, the driver manually activates the mu logic module 120. In these embodiments, the driver may provide an input (e.g., press a button or flip a switch) to activate the mu logic module 120, when the driver detects and/or suspects a high performance operating condition and/or a low mu road surface. In other embodiments, the mu logic module 120 may activate automatically and/or may continually operate while the vehicle 100 operates. In these embodiments, the mu logic module 120 may activate automatically in response to detecting an environmental or road condition indicative of a high performance or a low mu road surface. For example, the sensor 130 may detect an ambient temperature that is conducive to the formation of ice on a road surface, or environmental factors such as moisture, dust, or other factors that suggest a low mu road surface. In these embodiments, the mu logic module 120 may activate in response to any suitable information provided by the sensor 130 that is indicative of a low mu road condition. In other embodiments, the mu logic module 120 may engage when the engine 106 reaches a predetermined revolutions-per-minute (rpm) threshold or when rapid acceleration is detected (e.g., by monitoring accelerator pedal position, throttle body position, or throttle body sensor). Moreover, in various embodiments, the mu logic module 120 may continually operate as the vehicle 100 operates. In these embodiments, the mu logic module continually monitors vehicle operating data and adjust the drive force provided to one or more wheels 108 in response to a wheel slip event.

In various embodiments, the mu logic module 120 is configured to receive vehicle operational data from any suitable source including, for example, one or more sensors 130 or any other suitable data collection device and/or system. The mu logic module 120 is configured to receive data indicative of one or more vehicle operation conditions and/or environmental conditions including, for example, vehicle speed, road grade based on a vehicle accelerometer or GPS, brake pedal position, brake master cylinder position, accelerator pedal position, throttle open angle, gear position, two wheel drive, four wheel drive, or all wheel drive status, tire rotation speed, tire rotation acceleration, torque converter slip amount, hill-hold logic status, traction control system activation status, ABS brake sensor status, ABS brake system status, environment temperature, air moisture content, and/or any other suitable vehicle operating or environmental condition.

In various embodiments and with continued reference to FIG. 1, the ECU 110 comprises the mu logic module 120, which comprises a tractive force model. The ECU 110 continually monitors vehicle operational information and/or environmental conditions indicative of the operation of the vehicle 100 and the environment, in which, the vehicle 100 is operating. The ECU 110 continuously determines the drive force applied to the wheels 108 based on the vehicle 100 operating parameters being monitored. The ECU 110 continuously monitors wheel acceleration rate and/or wheel speed of one of more wheels 108 by monitoring the sensor 130 or any suitable system, which may include any suitable sensor or system (e.g., the ABS sensor, wheel speed sensor, and/or the like). The ECU 110 may compare the monitored or actual wheel acceleration rate and/or wheel speed to the expected wheel acceleration rate and/or speed. The ECU 110 calculates the expected wheel acceleration rate and/or wheel speed based on the mass of the vehicle 100, the grade of the road being traveled, and the drive force being created. Where the monitored wheel acceleration rate and/or wheel speed exceeds the expected wheel acceleration rate and/or wheel speed by a predetermined or dynamically determined margin, the ECU 110 identifies a wheel spin event. At the point that the wheel slip event occurs, the ECU 110 determines or captures the drive force causing the wheel slip. Based on this drive force, the ECU 110 calculates the road surface mu. In one embodiment, the road surface mu is determined by dividing the tractive force detected at the point the wheel slip event occurs by the mass of the vehicle 100 as applied to the road surface.

The mass of the vehicle 100 can be affected by road grade. In some operating scenarios, the mass of the vehicle 100 may be adjusted to account for road grade. This functionality ensures that the mu logic module 120 is operable on a road with a grade or a flat road. Moreover, the mu logic module 120 operates in drive mode and reverse mode. The mu logic module 120 is also capable of operating in vehicles that are front wheel drive, rear wheel drive, all wheel drive, and/or four wheel drive.

Once the road surface mu value is determined, the mu logic module 120 determines a maximum tractive force for the road based on the determined road surface mu and the tractive force model. The maximum tractive force may be adapted to provide target drive forces over the operating range of the vehicle 100 based on the vehicle's speed or other operating conditions. As such, the mu logic module 120 is capable of determining and applying a higher or lower tractive force to one or more wheels 108 at launch, and adjusting the applied tractive force as the vehicle speed increases.

In various embodiments, the ECU 110 and/or the mu logic module 120 continues to monitor and/or adjust the maximum tractive force and the associated tractive force range. In one exemplary operating scenario, the ECU 110 and/or the mu logic module 120 may gradually increase the maximum tractive force so that the drive force applied to one or more wheels 108 returns to the expected level (e.g., the level of drive force associated with the driver's input to the accelerator 114), while continuing to monitor the road mu. In another exemplary operating scenario, the ECU 110 and/or the mu logic module 120 may detect a second wheel slip event. In the case of the second wheel slip event, the mu logic module 120 and/or the ECU 110 may calculate a second road surface mu and associated maximum drive force to further adjust the drive force applied to one or more wheels 108. In these operating scenarios, the ECU 110 and/or mu logic module 120 continually monitors the environment and operating parameters of the vehicle 100 to provide safe operation. Moreover, the ECU 110 and/or the mu logic module 120 continuously adjusts the applied drive force to limit wheel slip event while providing the maximum drive force capable of being applied to the particular road being driven.

Figure 2A:
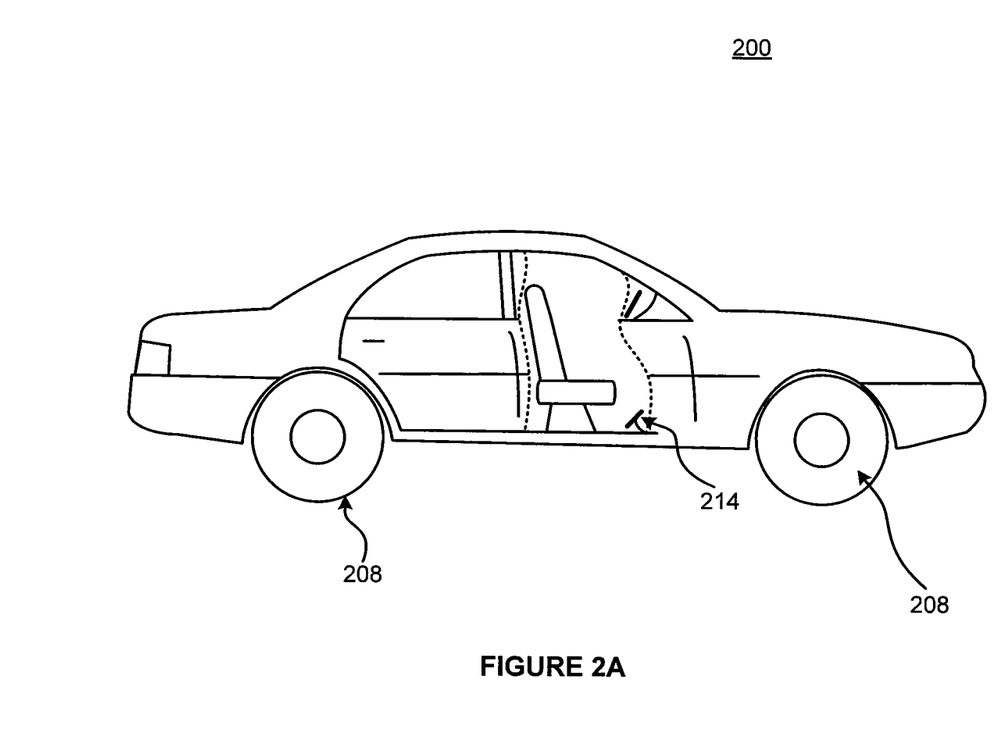
FIG. 2A illustrates a side view of an automobile in accordance with various embodiments.
Figure 2B:
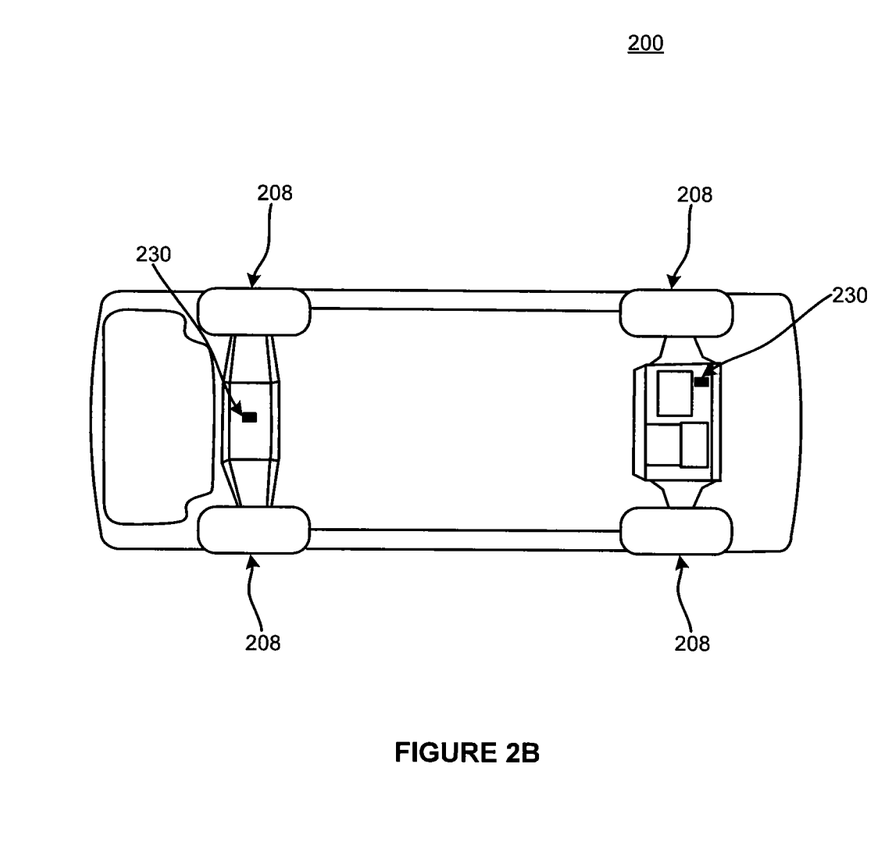
FIG. 2B illustrates a bottom view of an automobile in accordance with various embodiments.

In various embodiments and with reference to FIG. 2A and FIG. 2B, the vehicle 200 may be any suitable automobile including, for example, a car, truck, van, sport utility vehicle, and or the like. In these embodiments, the sensor 230 may be installed at any suitable location to detect operating parameters of the vehicle 200. For example, one or more sensors 230 may be installed on a front axle and/or a rear axle. The sensor 230 may be configured to monitor a wheel acceleration rate and/or a wheel speed of one or more wheels 208. The sensor 230 communicates the operating parameters to the ECU and/or the mu logic module. Based the information provided by the sensor 230, the ECU and/or the mu logic module can determine whether one or more of the wheels 208 is slipping.

More specifically, the ECU and/or the mu logic module may also receive information about the position of the accelerator 214. The information may be used by the ECU and/or mu logic module to determine the expected wheel acceleration rate and/or the wheel speed of the wheels 208. By comparing the actually wheel acceleration rate and/or the wheel speed detected by the sensor 230 to the expected wheel acceleration rate and/or the wheel speed based on the position of the accelerator 214, the ECU and/or mu logic module is capable of identifying a wheel slip event (e.g., where the actual wheel acceleration rate and/or wheel speed is greater than the expected wheel acceleration rate and/or the wheel speed).

Figure 3:
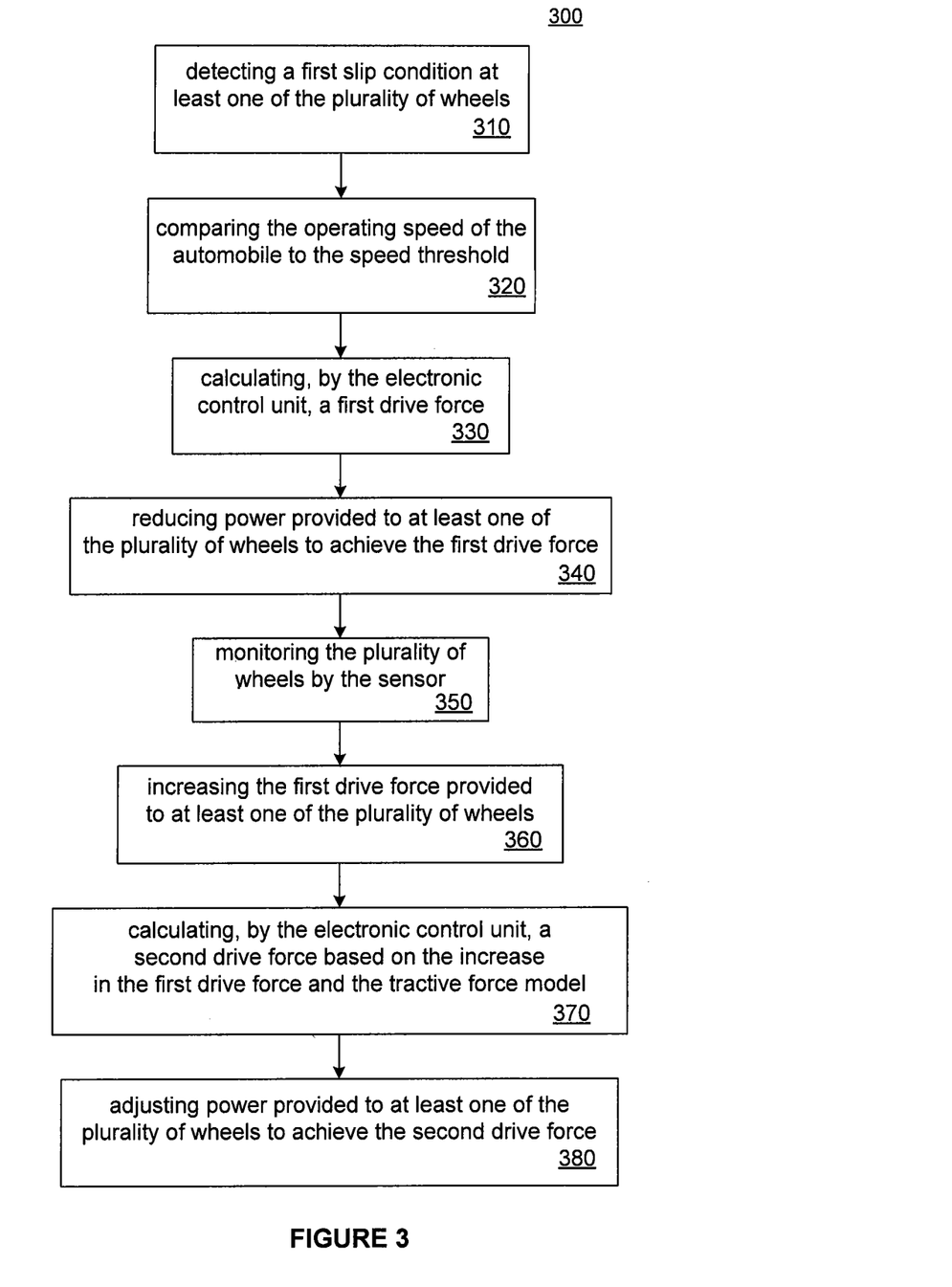
FIG. 3 is a box diagram of a control process of a control unit comprising a mu logic module in accordance with exemplary embodiments.

In various embodiments and with reference to FIG. 3, the ECU and/or mu logic module may be configured to perform a method to control and/or minimize wheel slip events for an automobile. In these embodiments, the automobile comprises a sensor, a plurality of wheels, and an electronic control unit which comprises and/or communicates with a mu control comprising a speed threshold and a tractive force model (Step 310). The sensor monitors at least one of the plurality of wheels to detect a first slip condition (Step 320). The ECU and/or the mu logic module may then compare the operating speed of the automobile to the speed threshold (Step 330). Typically, the operating speed would be low enough that the wheel slip event could be minimized without creating an unstable operating condition for the driver. Where the operating speed is within an acceptable range, the ECU or the mu logic module may invoke logic to minimize the wheel slip. The ECU or mu logic module calculates a first drive force in response to the first slip condition (Step 340). The ECU and/or mu logic module then reduces the power and/or the torque provided to at least one of the plurality of wheels to achieve the first drive force (Step 350). The sensor continues monitoring the plurality of wheels (Step 360). The ECU and/or mu logic module may increase the first drive force provided to at least one of the plurality of wheels (Step 360). The drive force is increased to gradually restore the expected drive force (e.g., the drive force corresponding the driver's input to the accelerator) to the wheels. The ECU and/or mu logic module calculates a second drive forced based on the increase in the first drive force and the tractive force model in response to detecting a second slip condition at one of the plurality of wheels by the sensor (Step 370). In response to determining the second drive force, the ECU and/or mu logic module adjusts the power provided to at least one of the plurality of wheels to achieve the second drive force to minimize and/or control wheel slippage (Step 380). As such, the ECU and/or mu logic module continually monitors and adjusts the drive force provided to at least one of the wheels to maximize the applied drive force, while stabilizing and controlling wheel slip events to ensure safe operation of an automobile.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Thus, the automobile described herein employs an aerodynamic chassis control system to limit and/or minimize the affect of yaw and roll created by environmental and operating conditions on an automobile with minimal penalty to improve ride comfort and performance of the automobile.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile, comprising:
a body;
a chassis configured to couple to a support of the body;

a plurality of wheels rotatably coupled to the chassis;
an engine configured to drive at least one of the plurality of wheels by applying a drive force and is at least partially enclosed by the body;
a steering wheel configured to communicate driver inputs to the plurality of wheels;
an accelerator configured to communicate driver inputs to the engine;
a sensor configured to monitor at least one of the plurality of wheels and detect a first slip condition of the at least one of the plurality of wheels; and
an electronic control unit capable of receiving data from the sensor, managing the operation of the engine, calculating a first drive force based on a tractive force model in response to the sensor detecting a first slip condition, the first drive force being a dynamically determined maximum drive force limiting the drive force below an expected drive force associated with the driver inputs, the electronic control unit further capable of applying the first drive force and subsequently increasing the first drive force based on the tractive force model to the expected drive force.

2. The automobile of claim 1, wherein the sensor continues to monitor the at least one of the plurality of wheels in response to the first slip condition to detect a second slip condition.

3. The automobile of claim 2, wherein the electronic control unit reduces the first drive force to a second drive force in response to the second slip condition.

4. The automobile of claim 3, wherein the second drive force is determined based on the tractive force model.

5. The automobile of claim 1, wherein the first slip condition is detected when the automobile is in either a drive gear or a reverse gear.

6. The automobile of claim 1, wherein the electronic control unit is configured to approximate a mu value of the road in response to vehicle operating conditions.

7. The automobile of claim 6, wherein the first drive force is determined as a function of the approximate mu value of the road.

8. The automobile of claim 1, wherein a mass of the automobile is used to determine the first tractive force.

9. The automobile of claim 1, wherein the tractive force model is employed by the electronic control unit in response to a first slip condition when the vehicle is operating within a predetermined speed range.

10. A method, comprising:
providing an automobile with a sensor, a plurality of wheels, and an electronic control unit, wherein the electronic control unit has a mu control including a speed threshold and a tractive force model;
detecting a first slip condition at one of the plurality of wheels by the sensor;
comparing the operating speed of the automobile to the speed threshold;
calculating, by the electronic control unit, a first drive force in response to the first slip condition, the first drive force being a dynamically determined maximum drive force less than an expected drive force based on the tractive force model;
reducing power provided to at least one of the plurality of wheels to achieve the first drive force;
monitoring the plurality of wheels by the sensor;
continuously increasing the first drive force provided to at least one of the plurality of wheels based on changing mu conditions detected by the sensor;
dynamically calculating, by the electronic control unit, a second drive force based on the increase in the first drive force and the tractive force model in response to detecting a second slip condition at the at least one of the plurality of wheels by the sensor; and
continuously adjusting power provided to the at least one of the plurality of wheels to achieve the second drive force in response to the electronic control unit dynamically calculating and updating the second drive force.

11. The method of claim 10, wherein the tractive force is a function of a mass of the automobile.

12. The method of claim 11, wherein the tractive force is a function of the mass and a road surface mu.

13. The method of claim 11, wherein the mass is a function of road grade.

14. The method of claim 11, wherein the first slip condition is detected by comparing an actual acceleration rate of the at least one of the plurality of wheels to an expected acceleration rate of the at least one of the plurality of wheels.

15. The method of claim 14, wherein the expected acceleration rate is a function of the mass of the automobile, a road grade and a drive force being created.

16. The method of claim 11, further comprising estimating a road surface mu.

17. The method of claim 16, wherein the road surface is mu is estimated by detecting an initial drive force at substantially the same time of the first slip condition.

18. An automobile, comprising:
a plurality of wheels;
an engine configured to provide a first drive force to at least one of the plurality of wheels; and
an electronic control unit comprising a mu drive-force model is in communication with the engine and configured to detect a slip condition of at least one of the plurality of wheels and estimate an applied drive force at the at least one of the plurality of wheels in response to the slip condition such that the first drive force is estimated at substantially the same time that the slip condition occurs, to estimate a road mu based on the first drive force, to continuously adjust the first drive force based on changes to the road mu, to calculate and communicate a second drive force to the engine such that power to the at least one of the plurality of wheels is reduced to a level that produces the second drive force, and to subsequently increase the second drive force based on the mu drive-force model.

19. The automobile of claim 18, wherein the mu drive-force model is configured to determine the second drive force based on the estimated road mu and a mass of the automobile.

20. The automobile of claim 18, wherein the mu drive-force model is engaged in response to a snow mode setting being selected.

* * * * *